(12) United States Patent
Dondi

(10) Patent No.: US 7,016,799 B2
(45) Date of Patent: Mar. 21, 2006

(54) APPARATUS AND METHOD FOR CHECKING THE MACHINING PROCESS OF A MACHINE TOOL

(75) Inventor: Valerio Dondi, Castel Maggiore (IT)

(73) Assignee: Marposs Società per Azioni, Bentivoglio (IT)

( * ) Notice: Subject to any disclaimer, the term of this patent is extended or adjusted under 35 U.S.C. 154(b) by 68 days.

(21) Appl. No.: 10/482,128

(22) PCT Filed: Jul. 5, 2002

(86) PCT No.: PCT/EP02/07519

§ 371 (c)(1),
(2), (4) Date: Dec. 24, 2003

(87) PCT Pub. No.: WO03/006204

PCT Pub. Date: Jan. 23, 2003

(65) Prior Publication Data

US 2004/0153285 A1    Aug. 5, 2004

(30) Foreign Application Priority Data

Jul. 11, 2001  (IT)  ............... BO2001A000434

(51) Int. Cl.
*G01C 25/00* (2006.01)
(52) U.S. Cl. ......................... 702/104; 451/1
(58) Field of Classification Search ............ 702/41, 702/42, 44, 48, 54, 103, 104, 105, 142, 145, 702/148, 163, 171, 183, 184, 189; 451/1, 451/8, 11, 27, 43
See application file for complete search history.

(56) References Cited

U.S. PATENT DOCUMENTS

| | | | |
|---|---|---|---|
| 4,820,092 A | | 4/1989 | Mueller et al. |
| 4,831,785 A | * | 5/1989 | Sigg ............................. 451/1 |
| 4,866,429 A | | 9/1989 | Granere |
| 5,044,125 A | * | 9/1991 | Lambert et al. .............. 451/27 |
| 5,168,758 A | | 12/1992 | Wolfer |
| 5,257,531 A | | 11/1993 | Motosugi et al. |
| 5,562,528 A | | 10/1996 | Ueyama et al. |
| 5,643,051 A | * | 7/1997 | Zhou et al. ................... 451/11 |
| 6,217,420 B1 | * | 4/2001 | Stocker et al. ................ 451/43 |
| 6,602,109 B1 | * | 8/2003 | Malkin et al. ................. 451/8 |

FOREIGN PATENT DOCUMENTS

| | | |
|---|---|---|
| DE | 4106053 | 9/1992 |
| DE | 4334933 | 4/1995 |
| DE | 19613530 | 10/1997 |
| JP | 61-164764 | 7/1986 |
| JP | 2-76668 | 3/1990 |

* cited by examiner

*Primary Examiner*—Marc S. Hoff
*Assistant Examiner*—Mohamed Charioui
(74) *Attorney, Agent, or Firm*—Dickstein Shapiro Morin & Oshinsky LLP

(57) ABSTRACT

An apparatus and a method are provided for checking a machining process of a machine tool, for example a grinding machine, to obtain information about the quantity of a material removed and the wear condition of a grinding-wheel. The apparatus comprises an acoustic sensor adapted to detect acoustic signals generated by contact between the grinding-wheel and the piece being machined, and a force-detecting sensor adapted to detect the force applied between the grinding-wheel and the piece during the machining. The method comprises processing signals provided by both sensors, defining time intervals on the basis of the signals of the acoustic sensor, and monitoring the signals of the force-detecting sensor in the time intervals.

18 Claims, 6 Drawing Sheets

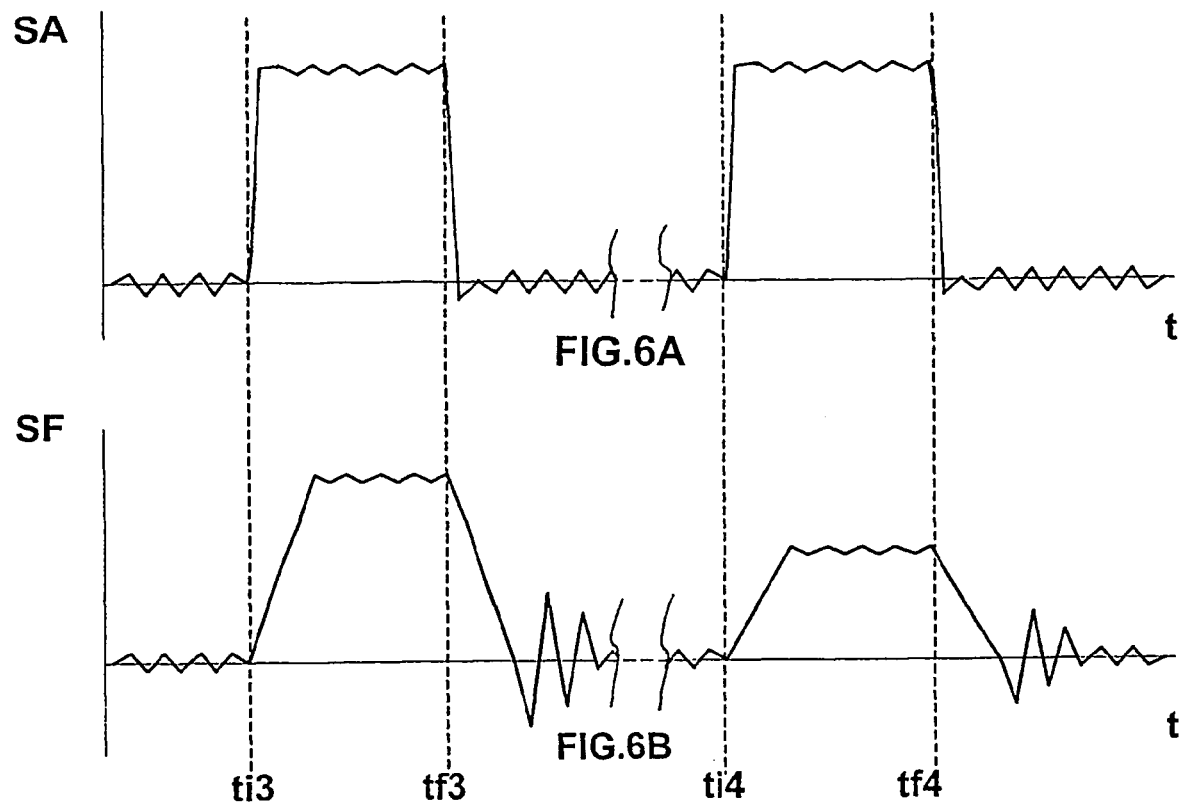

APPARATUS AND METHOD FOR CHECKING THE MACHINING PROCESS OF A MACHINE TOOL

TECHNICAL FIELD

The present invention relates to an apparatus for checking the machining process of a machine tool with a base and a tool-carrier slide, movable with respect to the base and carrying a tool, the apparatus including a support and reference system for supporting and referring a piece to be checked, a first sensor, adapted for sensing the force occurring between the tool and the piece and for emitting a first output signal and a processing and control unit connected to the first sensor and adapted for processing the first output signal.

The invention also relates to a method for checking the machining process of a machine tool.

BACKGROUND ART

The ever-pressing requirements to increase the productivity of machine tools, to improve the quality of the mechanical pieces that these machine tools produce, on the basis of ever-tighter tolerances, and to diminish the production costs call for minimizing the machine down-times and concurrently performing, whenever necessary, all the maintenance operations required for avoiding both the downgrade of the quality of the produced pieces and the costs deriving from scraps and re-machining of pieces.

For checking the machining process of computer numerical control ("CNC") machine tools, as lathes, grinding machines, milling machines, etc. there are utilized apparatuses provided with sensors that detect the magnitude of physical features connected to the process to be checked and indicate, to the machine numerical control, or directly to the operator, the need to perform maintenance or corrective procedures.

Similar apparatuses are those, for example, that detect the wear or the breakage of the tools and signal the need for their substitution or sharpening.

U.S. Pat. No. 5,070,655 discloses an apparatus for monitoring some specific working conditions of a machine tool, more particularly for detecting grinding wheel sharpness, loss of coolant or excessive vibrations.

The apparatus processes signals indicative of the power consumption, as provided by a power-detecting sensor, and signals indicative of the mechanical vibrations, as provided by an accelerometer, and emits a visual signal (in the form of a green, a yellow or a red light, the latter is associated with an acoustic signal) for indicating to the operator the condition of the process under control.

U.S. Pat. No. 5,718,617 discloses a system for measuring a force existing between a grinding wheel and a piece in the course of the machining of a computer numerical control ("CNC") grinding machine, by a force-detecting sensor mounted between the ball screw that activates the tool-carrier slide and the machine base. In the machine there can also be mounted accelerometers for compensating the signals arriving from the force-detecting sensor by removing components of said signals that depend on vibrations.

U.S. Pat. No. 5,044,125 discloses a machine tool, more specifically a grinding machine, with a force transducer that comprises piezoelectric sensors mounted adjacent the wheelhead to measure the magnitude of the force occurring between the grinding wheel and the piece. The signals output by the force transducer are sent to the numerical control that determines when there is the need to perform a grinding wheel dressing cycle.

The signal output by the force transducer is suitably processed and provides significant information relating to the machining or to the grinding wheel sharpness, but does not enable to accurately distinguish the time intervals when the grinding wheel is actually in contact with the piece. In fact, the amplitude of the signal output by the force transducer slowly increases when contact between grinding wheel and piece occurs and it slowly decreases when the grinding wheel is detached from the surface of the piece, as hereinafter described. Furthermore, immediately after the displacing of the grinding wheel away from the piece, the output signal of the force transducer has spurious components, due to the displacing of parts of the machine tool, that can have an amplitude comparable with that of the signal in the course of the machining and must not be considered during the processing.

DISCLOSURE OF INVENTION

An object of the present invention is to overcome the inconveniences of the known apparatuses.

This object is achieved by an apparatus for checking the machining process of a machine tool according to claim 1 and an associated checking method according to claim 10.

BRIEF DESCRIPTION OF THE DRAWINGS

The invention is now described in more detail with reference to the enclosed sheets of drawings, given by way of non-limiting example, wherein:

FIG. 6a shows the trend of the signal output by the acoustic sensor in the course of two machinings performed at different grinding wheel approach speeds;

FIG. 6b shows the trend of the signal output by the force-detecting sensor in the course of two machinings performed at different grinding wheel approach speeds;

BEST MODE FOR CARRYING OUT THE INVENTION

Figure 1:
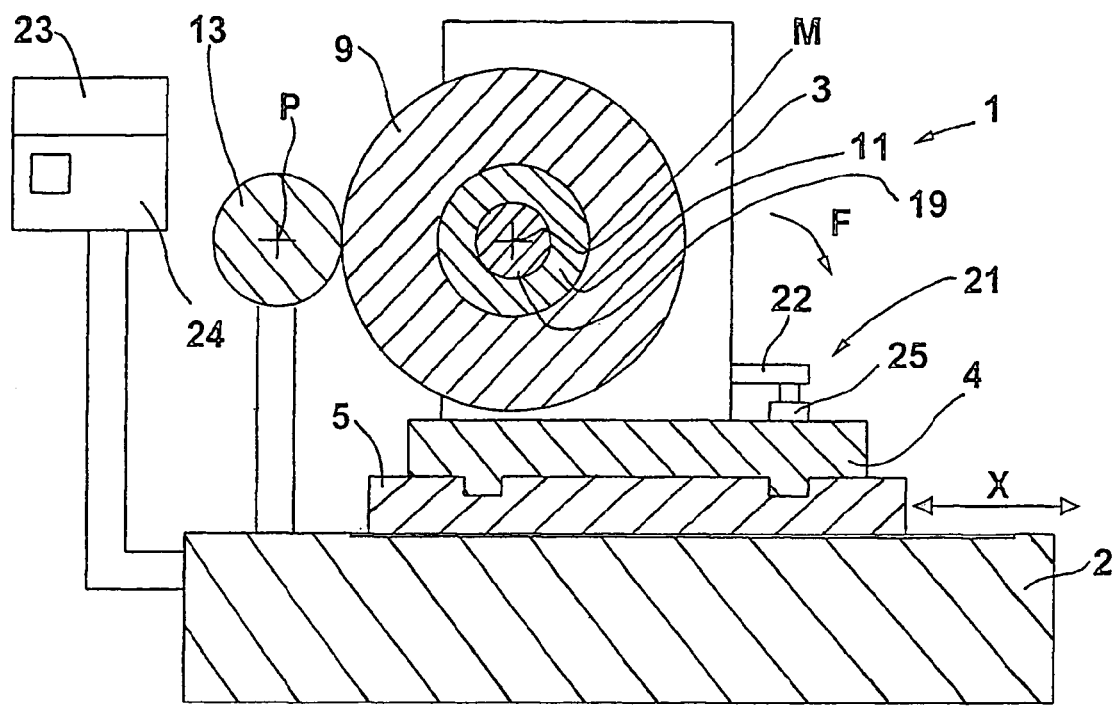
FIG. 1 is a schematic cross-sectional view of a grinding machine in the course of the machining of a mechanical piece and an apparatus according to the present invention.
Figure 2:
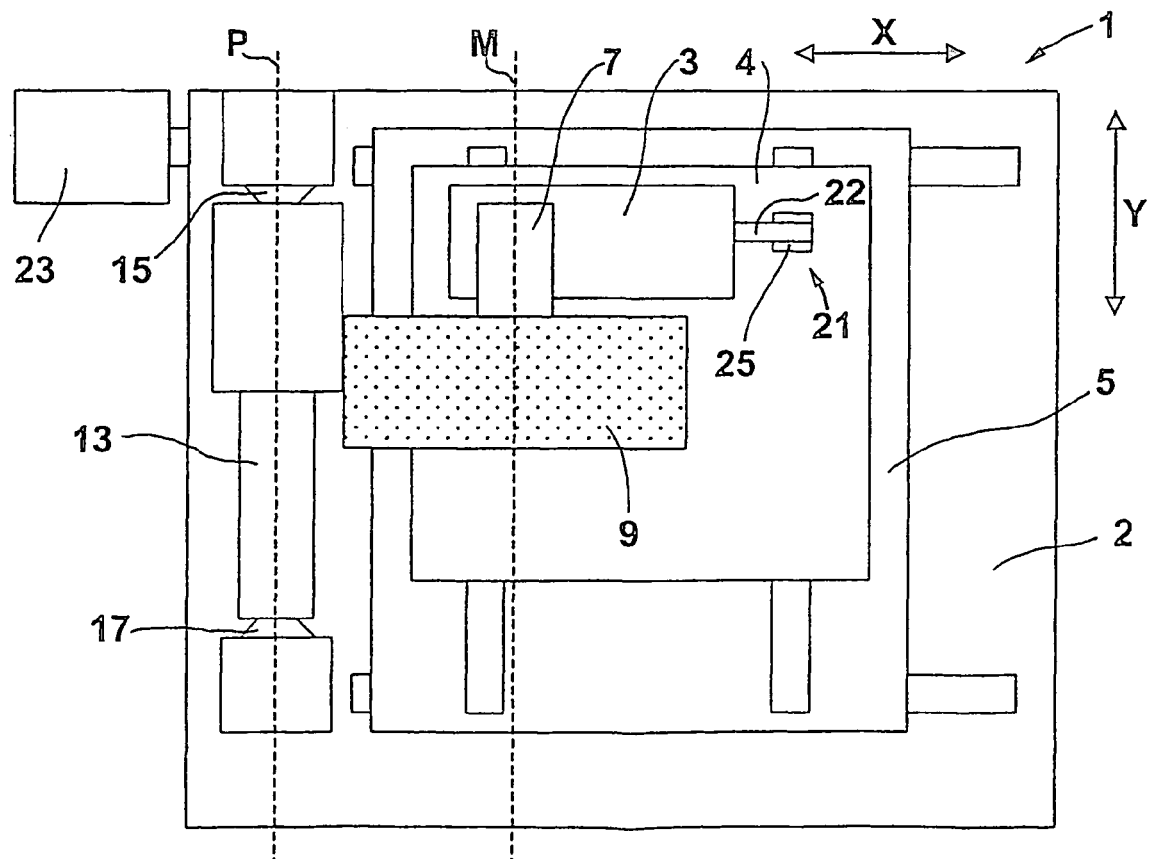
FIG. 2 is a plan view of the grinding machine and the apparatus of FIG. 1.

FIGS. 1 and 2 show, in an extremely simplified form, a machine tool, in particular a computer numerical control ("CNC") grinding machine 1, including a base 2, a tool-carrier slide 3, more specifically a grinding wheel-carrier coupled to a slide 4, movable with respect to the base 2 along an axis Y and coupled to a slide 5 movable along an axis X with respect to the base 2, in such a way that the tool-carrier slide 3 can displace with respect to the base 2 in the plane XY. A spindle 7 is mounted on the tool-carrier slide 3 and coupled, by means of a flange 11, to a grinding wheel 9. The spindle 7 is coupled to a motor, not shown in the figures, and enables the grinding wheel 9 to rotate about a longitudinal axis M.

The grinding machine 1 is utilized for machining a mechanical piece 13, with rotational symmetry, for example a shaft, supported, arranged and put into rotation about a longitudinal axis P, parallel to the longitudinal axis M, by means of a support and reference system of the known type consisting, for example, of a live center 15 and a dead center 17.

An apparatus for checking the machining process of the grinding machine 1 includes a first sensor, i.e. a force-detecting sensor 21, of a known type, with a first portion 22, coupled to the tool-carrier slide 3, and a second portion 25, coupled to the slide 4, a second sensor, more specifically an acoustic sensor (or AE sensor) 19, also of the known type, coupled to flange 11, and a processing and control unit 23 electrically connected, in a way that has not been shown in the figures, to the sensors 19 and 21 and to a numeric control 24 of the grinding machine 1. The force-detecting sensor 21 detects deformations of the tool-carrier slide 3, with respect to the slide 4, in the direction indicated by arrow F in FIG. 1, caused by the force applied by grinding wheel 9 on the piece 13 and provides a first output signal SF. The acoustic sensor 19 detects the acoustic signals generated by contact between the surfaces of the grinding wheel 9 and of the piece 13 in the course of the machining and provides a second output signal SA.

Figure 3A:
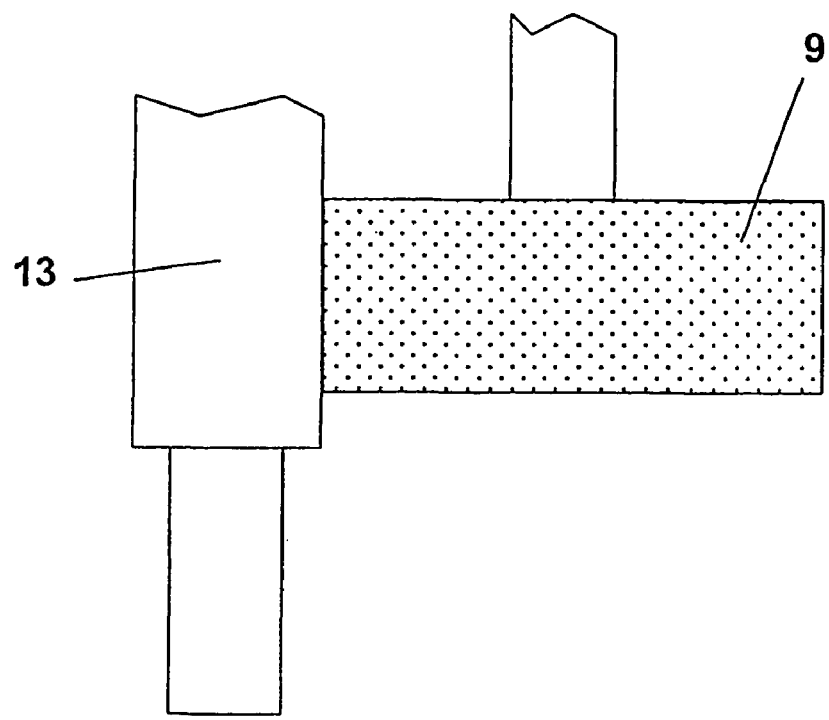
FIG. 3a is an enlarged scale view of a detail of the grinding machine shown in FIG. 2 in the course of a first machining phase of the piece.
Figure 3B:
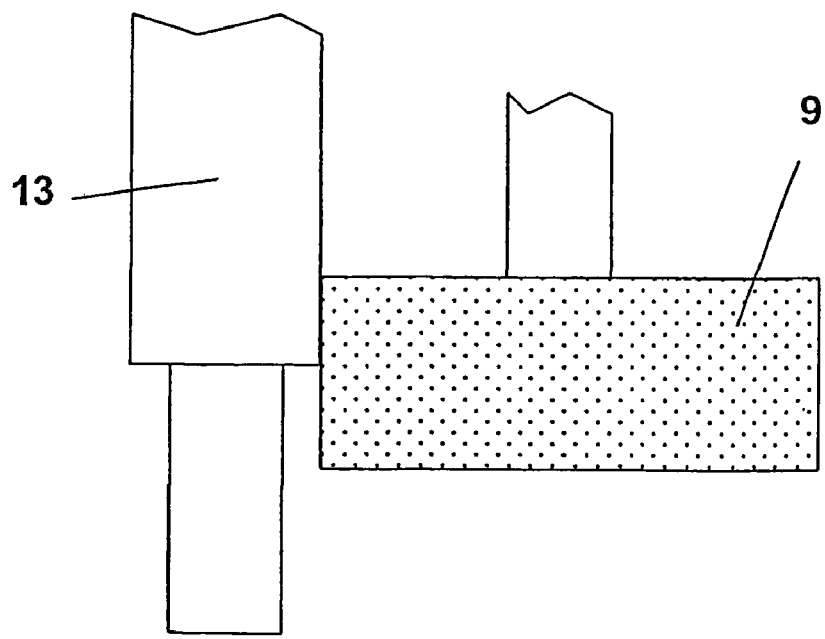
FIG. 3b is an enlarged scale view of a detail of the grinding machine shown in FIG. 2 in the course of a second machining phase of the piece.

FIGS. 3a and 3b show two subsequent phases of the machining of the piece 13, in which the extension of the contact surface between grinding wheel 9 and piece 13 differs. In the condition shown in FIG. 3a, there is the maximum amount of contact surface between grinding wheel 9 and piece 13, whereas in the condition shown in FIG. 3b just part of the grinding wheel 9 is in contact with piece 13.

Figure 4A:
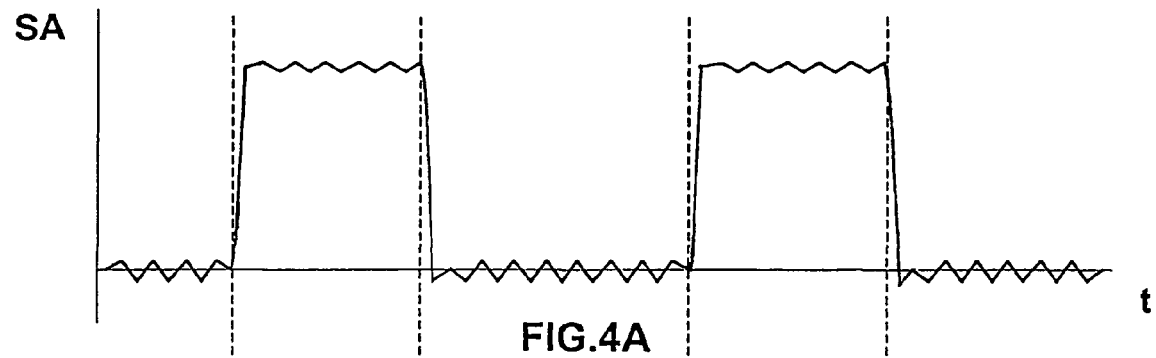
FIG. 4a shows the trend of the signal output by the acoustic sensor in the course of the two machining phases shown in FIGS. 3a and 3b, performed in sequence.
Figure 4B:
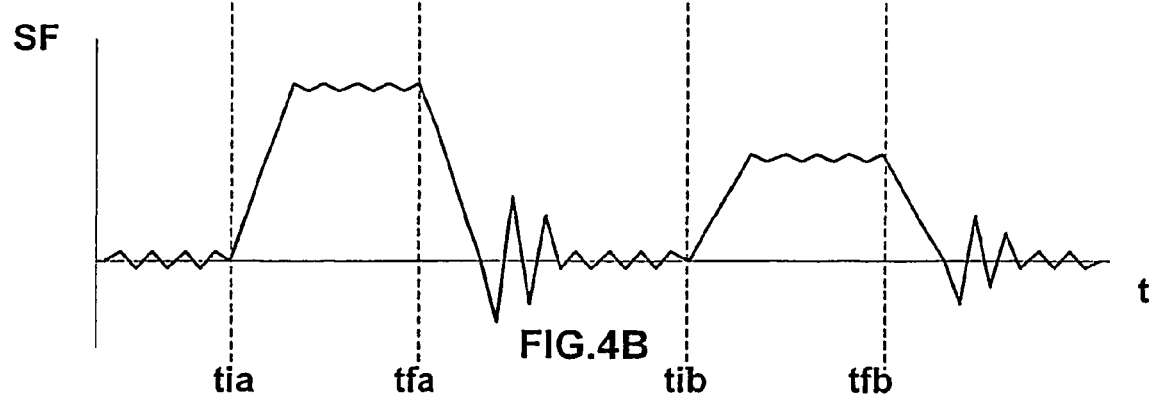
FIG. 4b shows the trend of the signal output by the force-detecting sensor in the course of the two machining phases shown in FIGS. 3a and 3b, performed in sequence.

FIGS. 4a and 4b show, in a time sequence, the trends of signal SA output by the acoustic sensor 19 and of the signal SF output by the force-detecting sensor 21 respectively, at the two subsequent machining phases shown in FIGS. 3a and 3b.

The instants of time tia, tfa, tib, tfb indicate the instant of start (tia, tib) and the instant of end (tfa, tfb) of contact between grinding wheel 9 and piece 13 in the machining phases shown in FIGS. 3a and 3b.

As shown in FIG. 4a, the signal SA output by the acoustic sensor 19 has an amplitude that very rapidly varies both as a consequence of grinding wheel 9 and piece 13 coming in touch with each other (instants tia, tib) and as a consequence of the grinding wheel 9 detaching from the piece 13 (instants tfa, tfb), but does not substantially depend on the extension of the surface of contact between grinding wheel 9 and piece 13.

In fact, the time frame in which the signal assumes a high logic value depends on the contact time between grinding wheel 9 and piece 13 (time lags tia–tfa, tib–tfb), but its amplitude does not undergo significant modifications in the course of the two different machining phases illustrated in FIGS. 3a and 3b in which there is a different extension of contact surface between grinding wheel 9 and piece 13.

On the contrary, the signal SF output by the force-detecting sensor slowly varies after grinding wheel 9 and piece 13 touch each other (instants tia, tib) and mutually detach (instants tfa, tfb), while its amplitude directly depends on the extension of the contact surface between grinding wheel 9 and piece 13 and more specifically, the larger the contact surface, the greater the amplitude of signal SF.

Figure 5A:
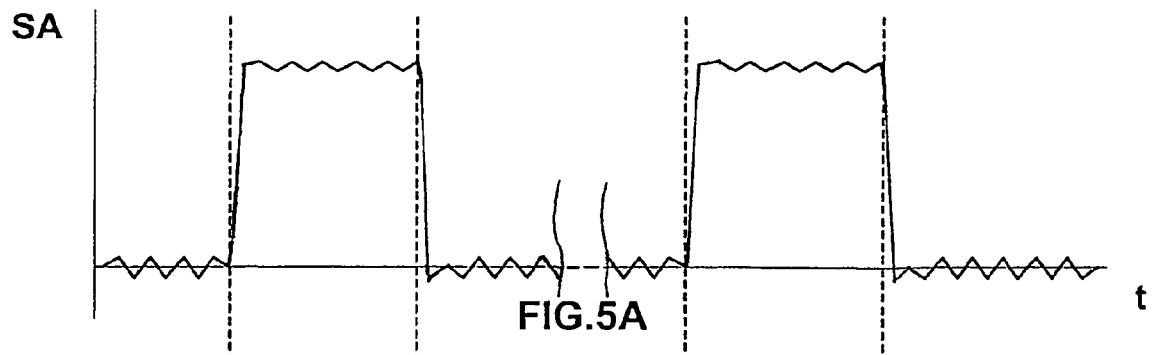
FIG. 5a shows the trend of the signal output by the acoustic sensor in the course of two machinings in which the grinding wheel has different cutting capacity.
Figure 5B:
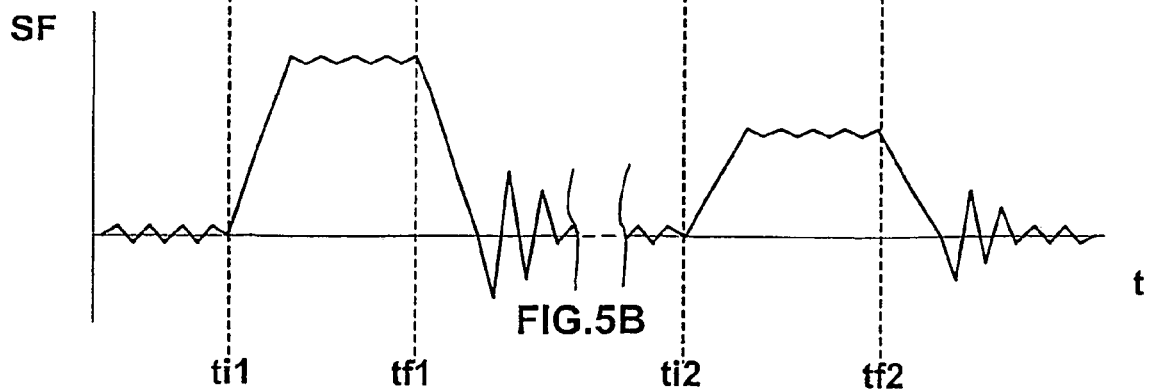
FIG. 5b shows the trend of the signal output by the force-detecting sensor in the course of two machinings in which the grinding wheel has different cutting capacity.

FIGS. 5a and 5b show the output signal SA of the acoustic sensor 19 and the output signal SF of the force-detecting sensor 21 in the course of two different machinings, that start, respectively, at instants ti1, ti2 and end, respectively, at instants tf1 and tf2, in which grinding wheel 9 has different cutting capacity. The instants ti1 and tf1 represent the instant of start and the instant of end of contact between grinding wheel 9 and piece 13 under a condition in which grinding wheel 9 has low cutting capacity. The instants ti2 and tf2 represent the instant of start and the instant of end of contact between grinding wheel 9 and piece 13 under a condition in which, at identical conditions as those of the previous case (for example with regard to the extension of the contact surface between grinding wheel and piece), the grinding wheel has high cutting capacity (for example after it has undergone dressing).

As shown in the figures, the output signal SA of the acoustic sensor 19 does not vary in a significant way if the grinding wheel 9 is more or less sharp, but its trend just depends on the contact time between grinding wheel 9 and piece 13. On the contrary, the output signal SF of the force-detecting sensor 21 slowly increases after contact occurs between the grinding wheel and the piece, slowly decreases when the grinding wheel detaches from the piece, and has an amplitude that depends on the cutting capacity of the grinding wheel 9, more specifically the amplitude of the signal SF increases as the cutting capacity of the grinding wheel 9 decreases.

FIGS. 6a and 6b show the output signal of the acoustic sensor 19 and the output signal of the force-detecting sensor 21 in the course of two different machinings, that start, respectively, at instants ti3 and ti4 and end, respectively, at instants tf3 and tf4, and that differ as far as the approach speed of the grinding wheel 9 is concerned. The instants ti4 and tf4 are the instant of start and the instant of end of contact between grinding wheel 9 and piece 13 under a condition in which the approach speed is relatively low whereas the instants ti3 and tf3 are the instant of start and the instant of end of contact between grinding wheel 9 and piece 13 under a condition in which the grinding wheel 9 has a faster approach speed.

From the figures it is possible to realize that the output signal SA of the acoustic sensor 19 does not substantially vary if the approach speed of the grinding wheel 9 varies, but its trend only depends on the amount of time in which there is contact between grinding wheel 9 and piece 13 (time intervals ti3–tf3, ti4–tf4). On the contrary, the output signal SF of the force-detecting sensor 21 slowly increases after contact occurs between grinding wheel 9 and piece 13 (instants ti3, ti4), slowly decreases at the end of contact between grinding wheel 9 and piece 13 and has an amplitude that directly depends on the approach speed of the grinding wheel 9. Higher approach speeds cause signals SF with greater amplitudes.

In summary, the output signal SA of the acoustic sensor 19 rapidly increases when grinding wheel 9 contacts the piece 13 and rapidly decreases when the grinding wheel displaces away from piece 13, and has an amplitude that substantially does not depend on the extension of the contact surface between grinding wheel 9 and piece 13, on the cutting capacity and on the approach speed of the grinding wheel 9. An analysis of such a signal provides information on the time frames in which the machining occurs (contact between grinding wheel and piece), regardless of the machining conditions. The force-detecting sensor 21, instead, generates a signal SF that slowly increases when the grinding wheel 9 contacts the piece 13, slowly decreases as they detach from one another, but has an amplitude that depends on the extension of the contact surface between grinding wheel 9 and piece 13, on the sharpness condition of the grinding wheel 9 and on the approach speed of the grinding wheel 9. Said output signal SF of the force-detecting sensor 21 does not enable to accurately define the time intervals in which machining occurs but it enables to obtain information on the machining process and more specifically on the contact area between piece 13 and grinding wheel 9, and on the cutting capacity of the grinding wheel 9 and on the approach speed of the grinding wheel 9.

A method according to the invention exploits in a synergetic way the information provided by the acoustic sensor 19 and by the force-detecting sensor 21. More specifically, the output signal SA of the acoustic sensor 19, owing to its rapid response features when contact occurs between the grinding wheel 9 and the piece 13 and to the amplitude substantially uncorrelated to the contact force, is utilized for determining the time intervals in which the output signal SF of the force-detecting sensor 21 provides useful information for checking the machining process, in other words the intervals in which the grinding wheel 9 is actually in contact with the piece 13. The trend of the output signal SF of the force-detecting sensor 21 in said time intervals provides significant information on the quantity of material that has been removed in the course of the machining (on the basis of the approach speed of the grinding wheel 9 and on the extension of the contact surface between grinding wheel 9 and piece 13) and on the sharpness condition of the grinding wheel 9.

Figure 7:
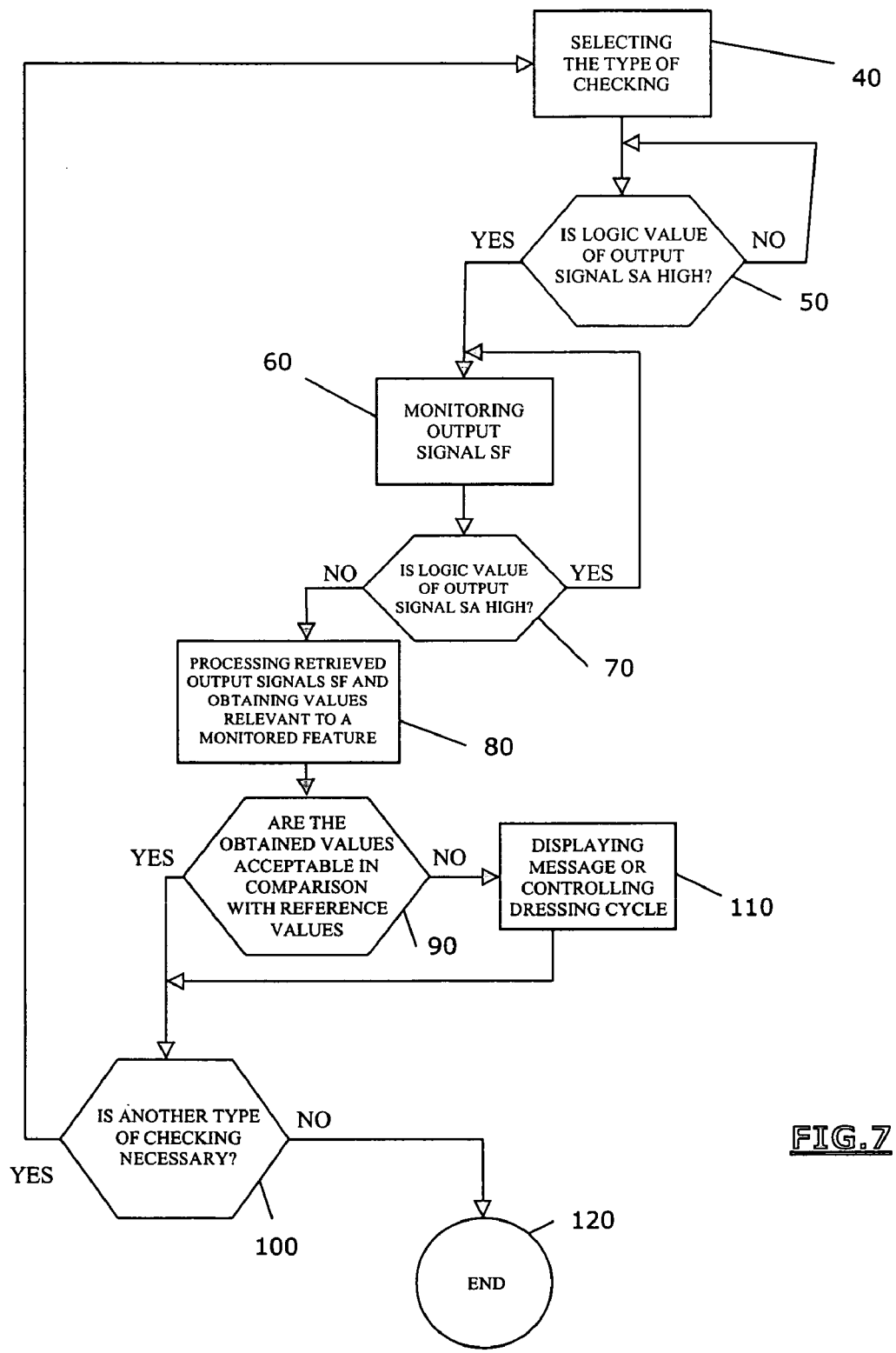
FIG. 7 is a flow chart showing the operation of an apparatus according to the present invention.

The operation of the apparatus according to the invention is now described with reference to the flow chart in FIG. 7.

In a first phase the numeric control 24 automatically selects, or the operator can manually select, the type of check to carry out, for example the wear condition of the grinding wheel 9 (block 40).

Subsequently the processing and control unit 23 checks the logic value of the output signal SA of the acoustic sensor 19 (block 50). As soon as the signal SA changes to a high logic value, there is detected an instant of start, with a substantially negligible delay with respect to the instant ti in which there occurs the actual contact between grinding wheel 9 and piece 13: the processing and control unit 23 consequently starts to monitor the output signal SF of the force-detecting sensor 21 (block 60). The processing and control unit 23 checks the logic value of the output signal SA (block 70). The monitoring of the output signal SF of the force-detecting sensor 21 continues until the output signal SA of the acoustic sensor 19 maintains a high logic value and, consequently, for all the time interval in which the grinding wheel 9 is in contact with the piece 13 (block 60). When the output signal SA of the acoustic sensor 19 changes to low logic value, there is detected an instant of end, with a substantially negligible delay with respect to the instant tf at which there occurs the actual displacing of the grinding wheel 9 away from the piece 13, and the monitoring of the signal SF by the processing and control unit 23 ends. The retrieved (and stored) output signal SF of the force-detecting sensor 21 undergoes a suitable processing for obtaining information relating to the monitored feature, in this case the cutting capacity of the grinding wheel 9, such processing including, for example, the integration of the signal SF in a time interval that substantially corresponds to the interval ti–tf (block 80). Subsequently, the value obtained by the processing is compared with values memorized and detected in a previous setting or "learning" phase of the apparatus (block 90). If the result of this comparison indicates that the monitored feature, in this case the wear of the grinding wheel 9, is within acceptable limits, it is possible to move on to carry out, if necessary (block 100), another type of checking (block 40). On the contrary, if the monitored feature exceeds the acceptable limits, the numeric control indicates to the operator, for example by displaying a message, the need to carry out a dressing cycle of the grinding wheel 9, or, once the machining of the piece ends, directly controls, without the operator's attendance, the dressing cycle of the tool (block 110). The procedure ends (block 120) when the required checkings have been completed.

In a preliminary setting or "learning" phase, that follows the installation of the sensors 19 and 21 on the machine 1, the processing and control unit 23 retrieves the output signals of the sensors 19 and 21 at different working conditions: different extensions of contact surface between grinding wheel 9 and piece 13, different wear conditions of the grinding wheel 9 and different approach speeds of the grinding wheel 9 and processes said signals for obtaining and memorizing reference values to be compared with those that are acquired during the checkings.

As an alternative to what is described above, after having chosen the type of check to carry out, the processing and control unit 23 can simultaneously acquire the output signals SA and SF of both the sensors 19 and 21 and, on the basis of the trend of the signal SA, determine the instant of start and the instant of end of contact, that substantially define the time interval in which machining occurs, and process thereafter, as previously described, the signal SF only at said time interval.

The sensors can be arranged on the grinding machine at positions that differ from those herein described, so long as they allow the correct detecting of the signals. More specifically, the acoustic sensor can be coupled to one of the two centers, or to a grinding wheel balancing device, if applied to the grinding machine. Instead, the force-detecting sensor can be arranged between an intermediate support of the piece, or a steady rest, if included, and the base of the machine.

Variants with respect to what is herein described are feasible and more specifically the force-detecting sensor 21 can be replaced with a power-detecting sensor for detecting the electric power absorbed by the motor of the grinding wheel 9, or with a strain gauge with high sensitivity, for example a strain gauge on a silicon film, for determining the deformations of the grinding wheel slide in the course of the machining and, consequently, the force applied by the grinding wheel 9 on piece 13. The trends of the signals output by the power-detecting sensor and by the strain gauge are alike that of the above described signal output by the force-detecting sensor 21 and thus provide identical information on the machining process. The acoustic sensor 19 can be substituted with a sensor of another type that is able to detect, with appropriate accuracy, the time intervals in which the grinding wheel 9 is in contact with piece 13. For this purpose there can be utilized, for example, optical sensors or proximity inductive sensors that measure the mutual position between grinding wheel 9 and piece 13.

Figure 8:
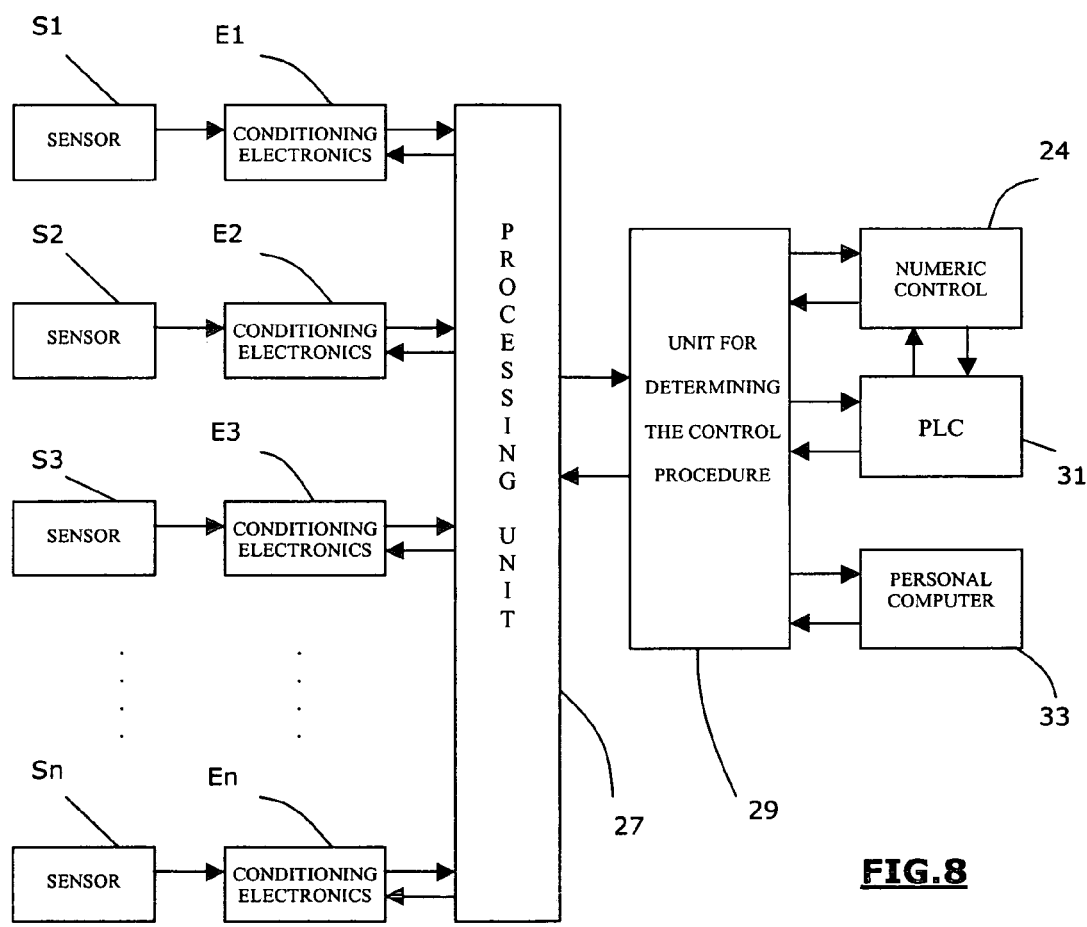
FIG. 8 is a block diagram showing the logic interconnections of the various elements that form the apparatus according to a preferred embodiment of the invention.

Furthermore, an apparatus according to the invention can include a greater number of sensors (identified as S1 . . . SN in FIG. 8), identical or of a different type with respect to those herein described, for checking a greater number of processes. The block diagram of FIG. 8 shows an apparatus including N sensors S1 . . . SN, connected with associated conditioning electronics E1 . . . EN, the outputs of which meet in a processing unit 27 connected with a unit 29, for determining the control procedure, connected with the numeric control 24 and the PLC (Programmable Logic Controller) 31 of the machine 1.

The signals output by the sensors S1 . . . SN are amplified and suitably processed by the conditioning electronics E1 . . . EN before being sent to the processing unit 27. Unit 29 for determining the control procedure, on the basis of the requests received by the numeric control 24 or by PLC 31, sends signals to the processing unit 27 in order that it can carry out the necessary processings of the output signal of a single sensor S1 . . . SN or synergetically utilize the output signals of a plurality of sensors S1 . . . SN, and sends the results of said processings to the numeric control and/or to the PLC and/or to other display units as, for example, a personal computer 33.

Many types of checkings can be carried out by an apparatus of this kind and they include automatic checkings of the various machining phases, checkings of the condition of the tools, control of their possible sharpening, in addition to checking of possible collisions and diagnosticating for preventive maintenance.

Obviously, an apparatus and a method according to the invention can be utilized for checking the machining process of other types of machine tools, as for example, lathes or milling machines.

What is claimed is:

1. An apparatus for checking the machining process of a machine tool, the machine tool including a base and a tool-carrier slide, movable with respect to the base and carrying a tool, the apparatus including:
   a support and reference system for supporting and referring a piece to be machined;
   a first sensor, adapted for sensing the force occurring between the tool and the piece and for emitting a first output signal;
   a second sensor, adapted for detecting the contact between the tool and the piece and for emitting a second output signal indicative of the occurrence of said contact; and
   a processing and control unit connected to the first sensor and to the second sensor and adapted for processing said first output signal on the basis of the second output signal and for providing information on the machining process of the machine tool.

2. The apparatus according to claim 1, wherein said second output signal is indicative of a time interval during which there is the contact between the tool and the piece, the processing and control unit being adapted to define said time interval on the basis of the second output signal and process said first output signal at said time interval.

3. The apparatus according to claim 2, wherein said second sensor is an acoustic sensor.

4. The apparatus according to claim 3, wherein said tool is a grinding wheel coupled to said tool-carrier slide and able to rotate with respect to it, said acoustic sensor being coupled to said grinding wheel.

5. The apparatus according to claim 1, wherein said second sensor is an acoustic sensor.

6. The apparatus according to claim 5, wherein said tool is a grinding wheel coupled to said tool-carrier slide and able to rotate with respect to it, said acoustic sensor being coupled to said grinding wheel.

7. The apparatus according to claim 1, wherein said first sensor is a force-detecting sensor.

8. The apparatus according to claim 7, wherein said tool-carrier slide is coupled to a slide, movable along a transverse direction, said force-detecting sensor being connected to said tool-carrier slide and to said slide.

9. The apparatus according to claim 1, wherein said first sensor is a power-detecting sensor.

10. The apparatus according to claim 1, wherein said first sensor is a strain gauge.

11. The apparatus according to claim 1, wherein said machine tool includes a numeric control connected to said processing and control unit.

12. A method for checking the machining process of a machine tool, the machine tool including a base and a tool-carrier slide, movable with respect to the base and carrying a tool, by means of an apparatus, said apparatus comprising a support and reference system for supporting and referring a piece to be machined, a first sensor adapted for sensing the force occurring between the tool and the piece and for emitting a first output signal, a second sensor, adapted for detecting contact between the tool and the piece and for emitting a second output signal having a logic value indicative of the occurrence of said contact, and a processing and control unit connected to the first and to the second sensors and adapted for processing said first output signal on the basis of the second output signal, the method including the following steps:
   checking the logic value of the second output signal and detecting an instant of start, substantially corresponding to the instant at which there occurs the contact between the tool and the piece;
   monitoring, from said instant of start, the first output signal;
   checking the logic value of the second output signal, and detecting and instant of end, substantially corresponding to the instant at which there occurs detachment between tool and piece;
   ending the monitoring of the first output signal at said instant of end;
   processing said first output signal;
   performing a comparison between the results of said processing and reference values; and
   deciding, on the basis of the result of said comparison, the necessary operations to be carried out.

13. The method according to claim 12, wherein the results of the processing of the first output signal are indicative of the quantity of material removed in the course of the machining of the piece.

14. The method according to claim 13, for the checking of the machining process of a grinding machine.

15. The method according to claim 12, wherein the results of the processing of the first output signal are indicative of the sharpness condition of the tool.

16. The method according to claim 15, for the checking of the machining process of a grinding machine.

17. An apparatus for checking the machining process of a machine tool, the apparatus comprising:
- a support and reference system for a piece to be machined;
- a first sensor, adapted for sensing force between a tool of the machine tool and the piece, and for emitting a first output signal;
- a second sensor, adapted for detecting contact between the tool and the piece, and for emitting a second output signal; and
- a processing and control unit, in communication with the first sensor and the second sensor, and adapted for processing said first output signal on the basis of the second output signal.

18. A method for checking the machining process of a machine tool machining a piece by means of a tool, the method comprising:
- providing a first sensor for sensing force between the tool and the piece, the first sensor emitting a first output signal;
- providing a second sensor for sensing contact between the tool and the piece, the second sensor emitting a second output signal;
- providing a processing and control unit for receiving the first and second output signals;
- detecting contact between the tool and the piece based on the second output signal;
- monitoring the first output signal after detecting the contact;
- detecting detachment between the tool and the piece based on the second output signal;
- ending the monitoring of the first output signal after detecting the detachment; and
- comparing results of the monitoring with reference values.

* * * * *